United States Patent
McCready et al.

(10) Patent No.: US 12,466,254 B2
(45) Date of Patent: Nov. 11, 2025

(54) METHODS AND APPARATUS FOR DETERMINING POSITIONS OF A STOWABLE PEDAL ASSEMBLY

(71) Applicant: Ford Global Technologies, LLC, Dearborn, MI (US)

(72) Inventors: Joshua McCready, Ypsilanti, MI (US); Scott J. Lauffer, Northville, MI (US); Daniel A. Gabor, Canton, MI (US); Seema Gami, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 514 days.

(21) Appl. No.: 17/844,417

(22) Filed: Jun. 20, 2022

(65) Prior Publication Data
US 2023/0406098 A1    Dec. 21, 2023

(51) Int. Cl.
*B60K 26/02* (2006.01)
*B60T 7/06* (2006.01)
*B60W 60/00* (2020.01)
*H02P 29/00* (2016.01)

(52) U.S. Cl.
CPC ............... *B60K 26/02* (2013.01); *B60T 7/06* (2013.01); *B60K 2026/026* (2013.01); *B60W 60/005* (2020.02); *H02P 29/00* (2013.01)

(58) Field of Classification Search
CPC ..... B60K 2026/026; B60K 26/02; B60T 7/06; B60W 60/005; H02P 29/00
See application file for complete search history.

(56) References Cited

U.S. PATENT DOCUMENTS

| 10,577,009 | B2 | 3/2020 | Lubischer et al. | |
|---|---|---|---|---|
| 2004/0200308 | A1* | 10/2004 | Flynn | B60K 26/02 74/512 |
| 2008/0079379 | A1* | 4/2008 | Odland | H02P 3/08 318/469 |
| 2008/0088960 | A1* | 4/2008 | Sim | B60R 1/07 359/873 |
| 2015/0364911 | A1* | 12/2015 | Pasinato | H02H 7/0851 318/466 |
| 2019/0092341 | A1 | 3/2019 | Stark et al. | |
| 2020/0017000 | A1* | 1/2020 | Lee | B60N 2/0248 |
| 2021/0188293 | A1 | 6/2021 | Taveira | |

FOREIGN PATENT DOCUMENTS

| KR | 20110131900 | 12/2011 |
|---|---|---|
| WO | 9814857 | 4/1998 |
| WO | 2020095020 | 5/2020 |
| WO | 2020240763 | 12/2020 |

\* cited by examiner

*Primary Examiner* — Fadey S. Jabr
*Assistant Examiner* — Michael J Herrera
(74) *Attorney, Agent, or Firm* — Lorne Forsythe; Hanley, Flight & Zimmerman, LLC

(57) ABSTRACT

Methods and apparatus for determining positions of a stowable pedal assembly are disclosed. An example apparatus to determine a position of a stowable pedal assembly of a vehicle includes motor control circuitry to provide a control signal to a motor operatively coupled to the stowable pedal assembly, the motor to cause movement of the stowable pedal assembly toward a desired position, response detection circuitry to detect a current response of the motor to the control signal, and position determination circuitry to determine the position of the stowable pedal assembly based on the current response.

20 Claims, 12 Drawing Sheets

METHODS AND APPARATUS FOR DETERMINING POSITIONS OF A STOWABLE PEDAL ASSEMBLY

FIELD OF THE DISCLOSURE

This disclosure relates generally to vehicles and, more particularly, to methods and apparatus for determining positions of a stowable pedal assembly.

BACKGROUND

A vehicle typically includes one or more pedals for controlling acceleration and/or braking of the vehicle. In some vehicles, a stowable pedal assembly can move between a stowed position and a deployed position based on whether the vehicle is being autonomously driven. The stowable pedal assembly in the deployed position is operable by a driver of the vehicle to enable manual driving of the vehicle, and the stowable pedal assembly is held in the stowed position during autonomous driving of the vehicle.

Figure 1:
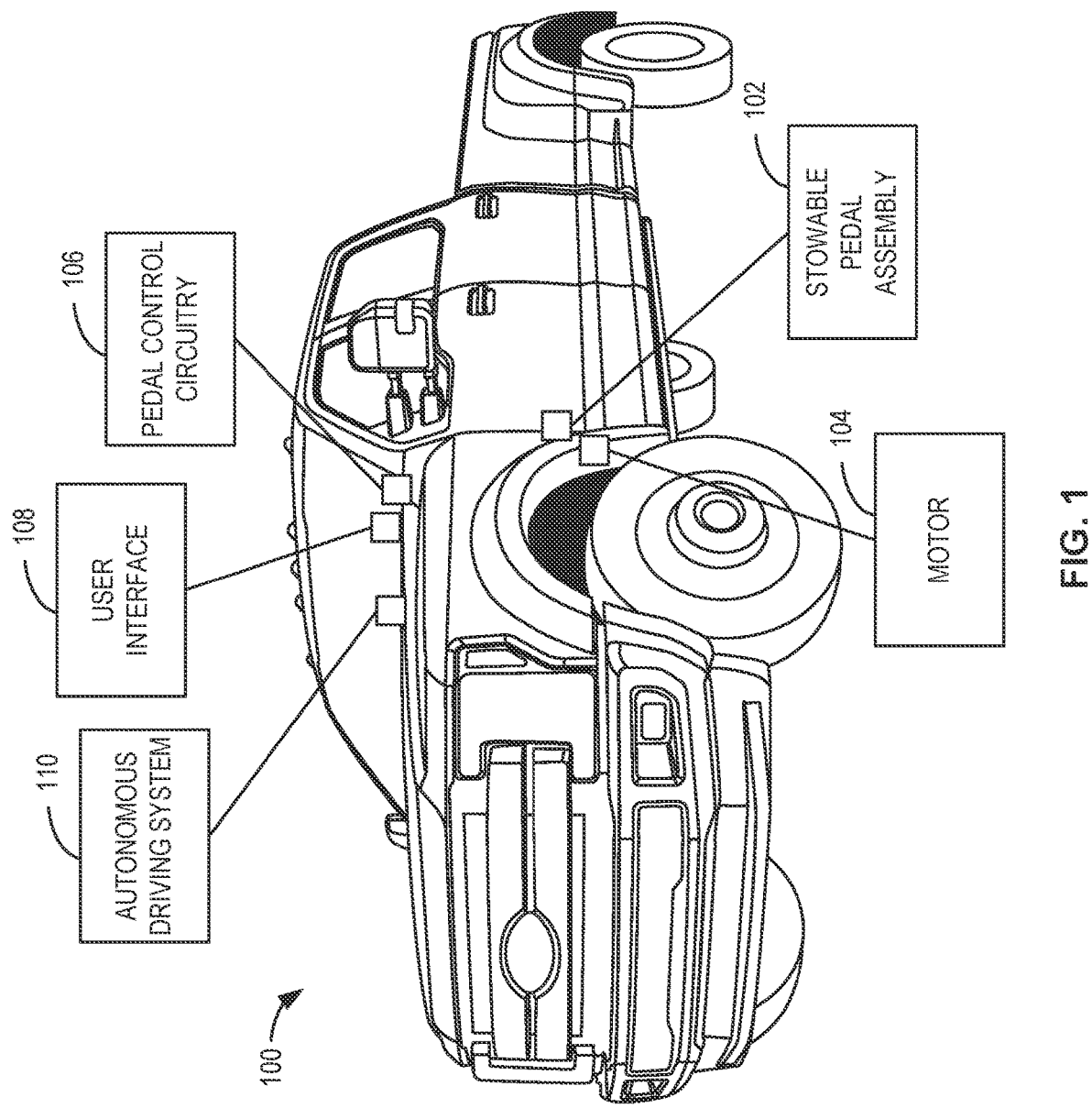
FIG. 1 illustrates an example vehicle implementing an example stowable pedal assembly in accordance with teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

A vehicle typically includes one or more pedals operable by a driver of the vehicle to control vehicle travel. The driver varies a force (e.g., a pressure) applied to the one or more pedals to control acceleration and/or braking of the vehicle. Alternatively, some vehicles are configured for autonomous driving in which the vehicle can be driven without manual input from the driver. In such vehicles, the pedals are not included and/or are not used during autonomous driving of the vehicle.

Some autonomous vehicles can switch between an autonomous driving mode and a manual driving mode. For instance, the vehicle may switch to the manual driving mode when autonomous driving is impractical or unavailable. For instance, autonomous driving may not be available when an autonomous driving system of the vehicle is inoperable, the driver wants to navigate to a destination not stored on a map, or the vehicle is indoors. To enable switching between the manual driving mode and the autonomous driving mode, some autonomous vehicles include a stowable pedal assembly that can move between a stowed position (e.g., a fully stowed position) and a deployed position (e.g., a fully deployed position) to prevent or enable operation of the pedals. When the vehicle is in the autonomous driving mode, the stowable pedal assembly is held in the stowed position in which the pedals are hidden and/or inaccessible to the driver of the vehicle. Conversely, when the vehicle is in the manual driving mode, the stowable pedal assembly is in the deployed position in which the pedals are accessible to and/or operable by the driver.

In some cases, the vehicle may switch between the manual driving mode and the autonomous driving mode based on user input from a user interface and/or based on a request provided by the autonomous driving system of the vehicle. In some cases, a position of the stowable pedal assembly is used to determine whether the pedals are fully deployed such that driver can safely operate the vehicle in the manual driving mode. Further, the position of the stowable pedal assembly can be used to select information for display on the user interface and/or identify features accessible to the driver when the vehicle is in a particular driving mode. Typically, the position of the stowable pedal assembly is measured using one or more position sensors (e.g., Hall effect sensors) operatively coupled to the stowable pedal assembly. However, implementing the position sensors increases part costs and/or weight associated with the stowable pedal assembly.

Examples disclosed herein determine positions of a stowable pedal assembly without the use of position sensors. Example pedal control circuitry disclosed herein provides one or more control signals to control a motor operatively coupled to the stowable pedal assembly, where rotation of the motor causes movement of the stowable pedal assembly.

In some examples, the pedal control circuitry detects a current response of the motor to the control signal over time, and further calculates a rate of change (e.g., a current rate, a slew rate) of the current response. In such examples, the pedal control circuitry determines a position of the stowable pedal assembly based on a magnitude and/or rate of change of the current response. For example, the pedal control circuitry identifies whether the current response is in an inrush state, a steady state, or a stall state based on whether the current response satisfies one or more conditions and/or durations associated with each state. In some examples, the pedal control circuitry determines whether the stowable pedal assembly is fully deployed, partially deployed, fully stowed, or partially stowed based on whether the current response satisfies and/or completes corresponding ones of the states. Advantageously, examples disclosed herein enable the pedal control circuitry to determine the position of the stowable pedal assembly using existing electronic components associated with the stowable pedal assembly. As such, examples disclosed herein do not require implementation of additional position sensors and, thus, reduce parts cost and/or weight associated with the stowable pedal assembly.

FIG. 1 illustrates an example vehicle 100 in which examples disclosed herein may be implemented. In the illustrated example of FIG. 1, the vehicle 100 is an autonomous vehicle that can switch between an autonomous driving mode and a manual driving mode. In this example, the vehicle 100 includes an example stowable pedal assembly 102, an example motor 104 operatively coupled to the stowable pedal assembly 102, example pedal control circuitry 106 electrically and/or operatively coupled to the motor 104, an example user interface 108, and an example autonomous driving system 110.

In the illustrated example of FIG. 1, when the vehicle 100 is in the autonomous driving mode, the stowable pedal assembly 102 is in a stowed position (e.g., a fully stowed position) and the autonomous driving system 110 controls vehicle travel by controlling speed and/or steering of the vehicle 100. In some examples, when the vehicle 100 switches to the manual driving mode, the stowable pedal assembly 102 moves to a deployed position (e.g., a fully deployed position) in which the driver can operate one or more pedals of the stowable pedal assembly 102 to adjust acceleration and/or braking of the vehicle 100. In some examples, the stowable pedal assembly 102 is in a partially deployed and/or a partially stowed position between the fully deployed and the fully stowed position. In this example, the pedal control circuitry 106 can determine a position of the stowable pedal assembly 102 based on detection of a current response from the motor 104.

Figure 2:
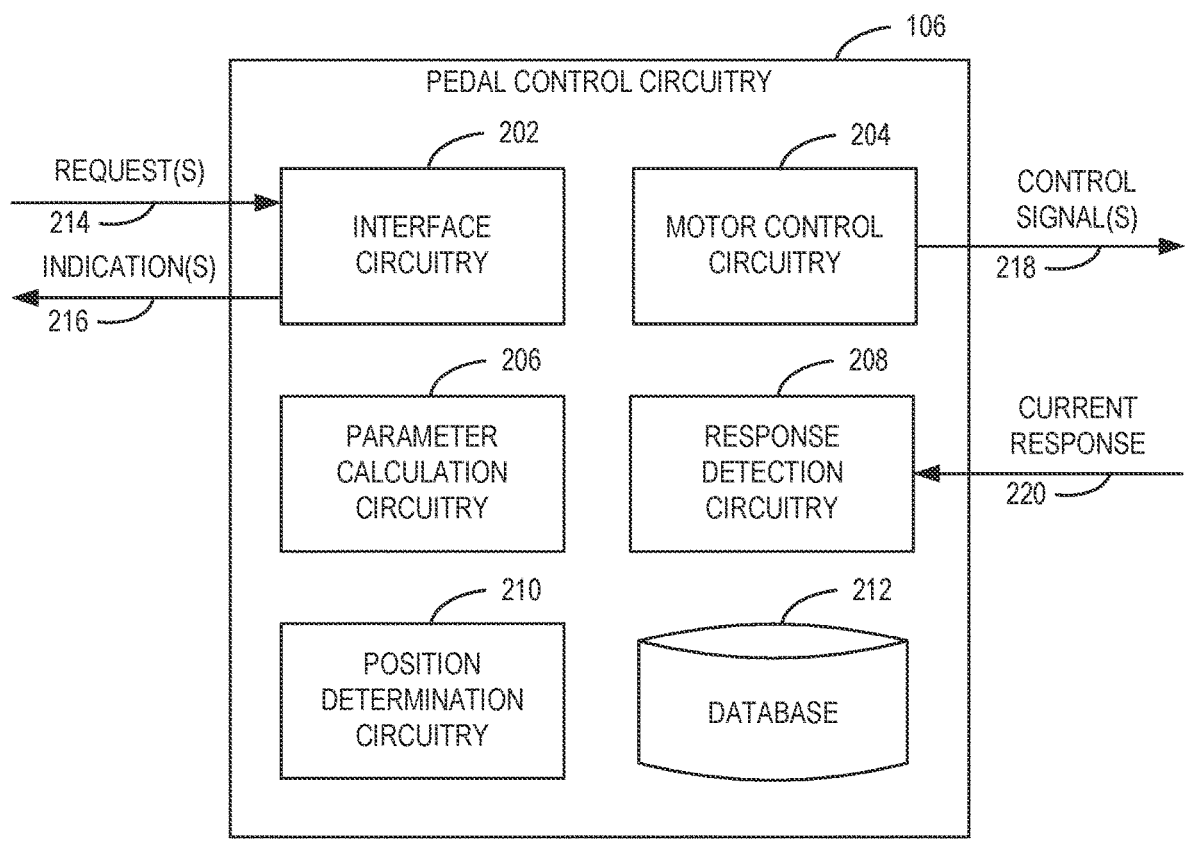
FIG. 2 is a block diagram of the example pedal control circuitry of FIG. 1.

FIG. 2 is a block diagram of the example pedal control circuitry 106 of FIG. 1 to control and/or determine a position of the example stowable pedal assembly 102 of FIG. 1. The pedal control circuitry 106 of FIG. 2 may be instantiated (e.g., creating an instance of, bring into being for any length of time, materialize, implement, etc.) by processor circuitry such as a central processing unit executing instructions. Additionally or alternatively, the pedal control circuitry 106 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers. In the illustrated example of FIG. 2, the pedal control circuitry 106 includes example interface circuitry 202, example motor control circuitry 204, example parameter calculation circuitry 206, example response detection circuitry 208, example position determination circuitry 210, and an example database 212.

In the illustrated example of FIG. 2, the database 212 stores data utilized and/or obtained by the pedal control circuitry 106. In some examples, the database 212 stores one or more positions of the stowable pedal assembly 102. The example database 212 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example database 212 may be in any data format such as, for example, binary data, comma delimited data, tab delimited data, structured query language (SQL) structures, etc. While, in the illustrated example, the example database 212 is illustrated as a single device, the example database 212 and/or any other data storage devices described herein may be implemented by any number and/or type(s) of memories.

The example interface circuitry 202 is communicatively coupled to the user interface 108 and/or the autonomous driving system 110 of FIG. 1 to receive and/or obtain one or more example requests 214 therefrom. For example, the interface circuitry 202 obtains the requests 214 in response to the driver of the vehicle 100 providing user input via the user interface 108. In some examples, the requests 214 indicate a desired driving mode (e.g., an autonomous driving mode or a manual driving mode) of the vehicle 100 and/or a desired position (e.g., stowed or deployed) of the stowable pedal assembly 102. Additionally or alternatively, the interface circuitry 202 obtains the requests 214 from the autonomous driving system 110 in response to the autonomous driving system 110 determining that the vehicle 100 is to switch between the autonomous driving mode and the manual driving mode. For example, the autonomous driving system 110 may determine to switch the vehicle 100 to the manual driving mode in response to the driver wanting to navigate to a destination not stored on a map and/or or the vehicle 100 being indoors.

In the illustrated example of FIG. 2, the interface circuitry 202 provides one or more example indications 216 to the user interface 108 for display to the driver. In some examples, the indications 216 cause the user interface 108 to display a position of the stowable pedal assembly 102 (e.g., whether the stowable pedal assembly is 102 is fully stowed, partially stowed, fully deployed, or partially deployed) and/or a driving mode of the vehicle 100 (e.g., whether the vehicle 100 is configured for autonomous driving or manual driving). In some examples, the user interface 108 can selectively disable and/or enable features of the vehicle 100 based on whether the vehicle 100 is in the autonomous driving mode or the manual driving mode. In some examples, the interface circuitry 202 is instantiated by processor circuitry executing interface circuitry instructions and/or configured to perform operations such as those represented by the flowcharts of FIGS. 7 and/or 8.

The example motor control circuitry 204 controls the example motor 104 of FIG. 1 by sending one or more example control signals 218 to adjust a voltage of the motor 104. In some examples, the motor control circuitry 204 adjusts a speed of rotation of the motor 104 by adjusting the magnitude of the voltage, where the magnitude of the voltage corresponds to a magnitude of current flow through the motor 104. Furthermore, the motor control circuitry 204 can use an H-bridge to switch polarity of the voltage. By switching the polarity, the motor control circuitry 204 switches a direction of the current flow through the motor 104 and, thus, a rotation direction of the motor 104. In this example, the motor 104 is operatively coupled to the stowable pedal assembly 102 such that operation of the motor 104 causes movement of the stowable pedal assembly 102 between the deployed and stowed positions. For examples, the stowable pedal assembly 102 can move from the stowed position to the deployed position when the motor 104 rotates in a first direction. Conversely, the stowable pedal assembly 102 can move from the deployed position to the stowed position when the motor 104 rotates in a second direction opposite the first direction. In some examples, a speed and/or direction of movement of the stowable pedal assembly 102 corresponds to the speed and/or direction of rotation of the motor 104. In some examples, the motor control circuitry 204 is instantiated by processor circuitry executing motor control circuitry instructions and/or configured to perform operations such as those represented by the flowcharts of FIGS. 7 and/or 8.

The example response detection circuitry 208 detects an example current response 220 of the motor 104 to the control signals 218. For example, the response detection circuitry 208 is electrically coupled to the motor 104 such that the response detection circuitry 208 receives a current flow from the motor 104 and detects a magnitude of the current response 220 over time. In some examples, the response detection circuitry 208 causes storage of the measured magnitude over time in the database 212. In some examples, the response detection circuitry 208 is instantiated by processor circuitry executing response detection circuitry instructions and/or configured to perform operations such as those represented by the flowcharts of FIGS. 7 and/or 8.

The example parameter calculation circuitry 206 calculates one or more parameters for use in determining the position of the stowable pedal assembly 102. For example, the parameter calculation circuitry 206 determines and/or estimates a rate of change (e.g., a slew rate) of the current response 220 detected by the response detection circuitry 208. In some examples, the parameter calculation circuitry 206 is instantiated by processor circuitry executing parameter calculation circuitry instructions and/or configured to perform operations such as those represented by the flowcharts of FIGS. 7 and/or 8.

The example position determination circuitry 210 determines a present position (e.g., a current position) of the stowable pedal assembly 102 based on the current response 220. For example, the position determination circuitry 210 determines whether the current response 220 is in one of an inrush state (e.g., a surge state, a rush state, a startup state), a steady state (e.g., a running state), or a stall state (e.g., a load state, an end of travel state). In some such examples, the position determination circuitry 210 determines the state of the current response 220 based on whether the current response 220 satisfies one or more conditions associated with each of the states. Based on the determined state of the current response 220 and a direction of the current flow to the motor 104, the position determination circuitry 210 determines whether the stowable pedal assembly 102 is in a fully stowed position, a partially stowed or partially deployed position, or a fully deployed position. In some examples, the position determination circuitry 210 causes storage of the determined position in the database 212. In some examples, the position determination circuitry 210 instructs the interface circuitry 202 to enable or disable one or more features of the vehicle 100 based on the determined position. For example, the interface circuitry 202 instructs the autonomous driving system 110 of FIG. 2 to continue autonomous driving of the vehicle 100 until the position determination circuitry 210 determines that the stowable pedal assembly 102 is in the fully deployed position. In some examples, the position determination circuitry 210 is instantiated by processor circuitry executing position determination circuitry instructions and/or configured to perform operations such as those represented by the flowcharts of FIGS. 7 and/or 8.

In some examples, the pedal control circuitry 106 includes means for interfacing. For example, the means for interfacing may be implemented by the interface circuitry 202. In some examples, the interface circuitry 202 may be instantiated by processor circuitry such as the example processor circuitry 912 of FIG. 9. For instance, the interface circuitry 202 may be instantiated by the example microprocessor 1000 of FIG. 10 executing machine executable instructions such as those implemented by at least blocks 702, 704, 706, 716, 720 of FIG. 7. In some examples, the interface circuitry 202 may be instantiated by hardware logic circuitry, which may be implemented by an ASIC, XPU, or the FPGA circuitry 1100 of FIG. 11 structured to perform operations corresponding to the machine readable instructions. Additionally or alternatively, the interface circuitry 202 may be instantiated by any other combination of hardware, software, and/or firmware. For example, the interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the pedal control circuitry 106 includes means for controlling a motor. For example, the means for controlling a motor may be implemented by the motor control circuitry 204. In some examples, the motor control circuitry 204 may be instantiated by processor circuitry such as the example processor circuitry 912 of FIG. 9. For instance, the motor control circuitry 204 may be instantiated by the example microprocessor 1000 of FIG. 10 executing machine executable instructions such as those implemented by at least block 708 of FIG. 7. In some examples, the motor control circuitry 204 may be instantiated by hardware logic circuitry, which may be implemented by an ASIC, XPU, or the FPGA circuitry 1100 of FIG. 11 structured to perform operations corresponding to the machine readable instructions. Additionally or alternatively, the motor control circuitry 204 may be instantiated by any other combination of hardware, software, and/or firmware. For example, the motor control circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the pedal control circuitry 106 includes means for calculating. For example, the means for calculating may be implemented by the parameter calculation circuitry 206. In some examples, the parameter calculation circuitry 206 may be instantiated by processor circuitry such as the example processor circuitry 912 of FIG. 9. For instance, the parameter calculation circuitry 206 may be instantiated by the example microprocessor 1000 of FIG. 10 executing machine executable instructions such as those implemented by at least block 712 of FIG. 7. In some examples, the parameter calculation circuitry 206 may be instantiated by hardware logic circuitry, which may be implemented by an ASIC, XPU, or the FPGA circuitry 1100 of FIG. 11 structured to perform operations corresponding to the machine readable instructions. Additionally or alternatively, the parameter calculation circuitry 206 may be instantiated by any other combination of hardware, software, and/or firmware. For example, the parameter calculation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the pedal control circuitry 106 includes means for detecting current. For example, the means for detecting current may be implemented by the response detection circuitry 208. In some examples, the response detection circuitry 208 may be instantiated by processor circuitry such as the example processor circuitry 912 of FIG. 9. For instance, the response detection circuitry 208 may be instantiated by the example microprocessor 1000 of FIG. 10 executing machine executable instructions such as those implemented by at least block 710 of FIG. 7. In some examples, the response detection circuitry 208 may be instantiated by hardware logic circuitry, which may be implemented by an ASIC, XPU, or the FPGA circuitry 1100 of FIG. 11 structured to perform operations corresponding to the machine readable instructions. Additionally or alternatively, the response detection circuitry 208 may be instantiated by any other combination of hardware, software, and/or firmware. For example, the response detection circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the pedal control circuitry 106 includes means for determining position. For example, the means for determining position may be implemented by the position determination circuitry 210. In some examples, the position determination circuitry 210 may be instantiated by processor circuitry such as the example processor circuitry 912 of FIG. 9. For instance, the position determination circuitry 210 may be instantiated by the example microprocessor 1000 of FIG. 10 executing machine executable instructions such as those implemented by at least blocks 714, 718 of FIG. 7 and blocks 802, 804, 806, 808, 810, 812, 814, 816, 818, 820, 822, 824 of FIG. 8. In some examples, the position determination circuitry 210 may be instantiated by hardware logic circuitry, which may be implemented by an ASIC, XPU, or the FPGA circuitry 1100 of FIG. 11 structured to perform operations corresponding to the machine readable instructions. Additionally or alternatively, the position determination circuitry 210 may be instantiated by any other combination of hardware, software, and/or firmware. For example, the position determination circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
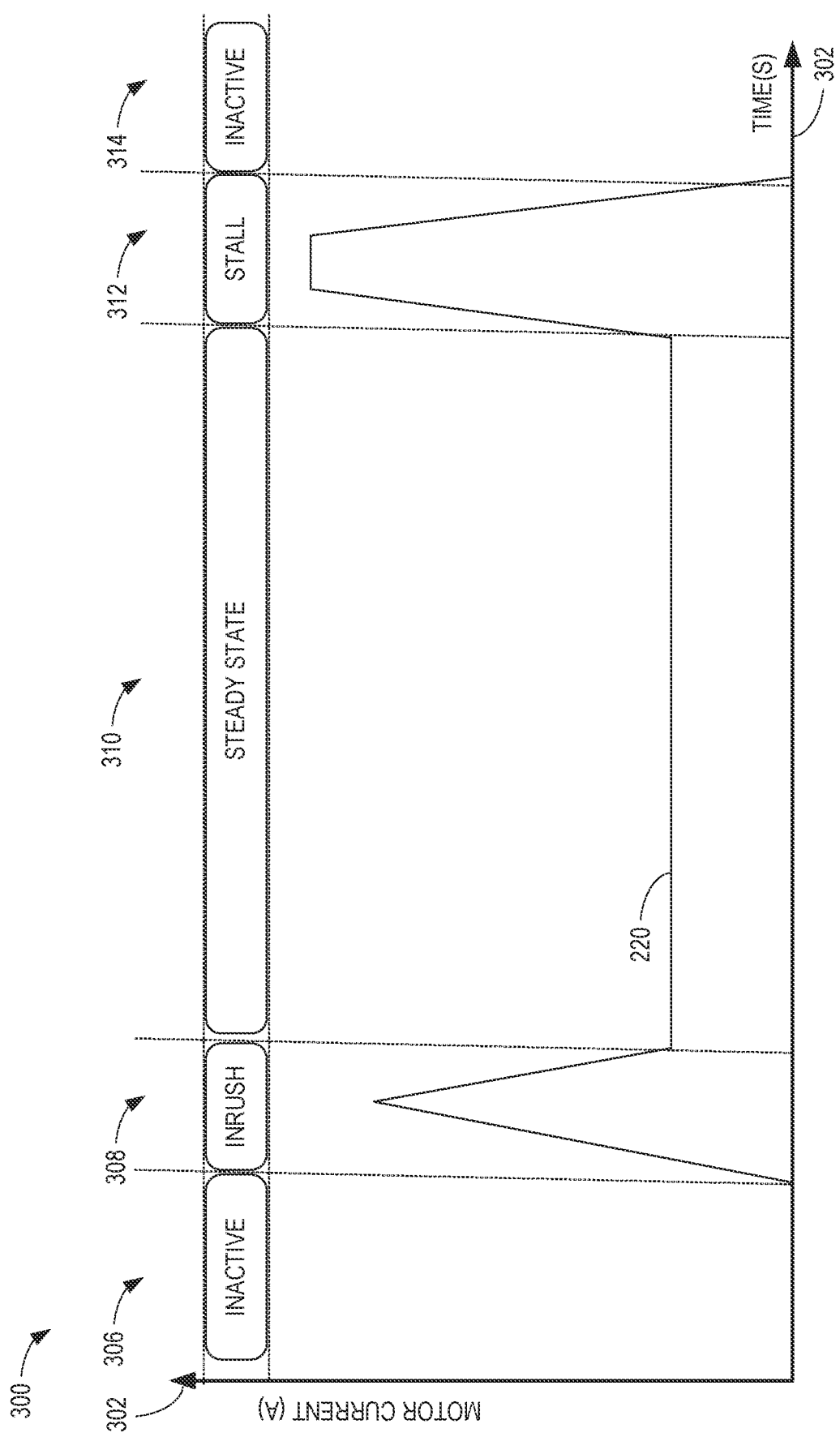
FIG. 3 illustrates an example current response of an example motor operatively coupled to the stowable pedal assembly of FIG. 1.

FIG. 3 is an example graph 300 representing an example current response 220 of the example motor 104 of FIG. 1. For example, the example response detection circuitry 208 of FIG. 2 produces the graph 300 of FIG. 3 in response to detecting a magnitude of the current response 220 over time. In the illustrated example of FIG. 3, the graph 300 includes an example vertical axis 302 representing the magnitude of the current response 220 (in amperes (A)), and an example horizontal axis 304 representing time (in seconds (s)). In this example, the current response 220 includes a first example inactive state 306, an example inrush state 308, an example steady state 310, an example stall state 312, and a second example inactive state 314.

In some examples, the current response 220 is in the first inactive state 306 when the motor 104 is not operating. For example, during the first inactive state 306, the example motor control circuitry 204 of FIG. 2 does not provide the control signal(s) 218 to the motor 104 and, thus, current does not flow to the motor 104 to cause rotation thereof. As such, during the first inactive state 306, the motor 104 does not cause movement of the stowable pedal assembly 102 of FIG. 1, such that the stowable pedal assembly 102 remains in its present (e.g., stored) position.

In this example, the current response 220 transitions to the inrush state 308 in response to the motor control circuitry 204 providing the control signal(s) 218 to the motor 104 to cause current flow thereto. In this example, the inrush state 308 occurs when the motor 104 is first switched on and produces an initial surge and/or spike in the current response 220. For example, when the motor 104 is initially turned on, the motor 104 draws current to initially charge electrical components (e.g., capacitors, inductors, transducers) associated with the motor 104, thus causing a spike and/or surge in the current response 220 during the inrush state 308. In some examples, operation and/or rotation of the motor 104 begins during and/or upon completion of the inrush state 308.

In the illustrated example of FIG. 3, the current response 220 moves to the steady state 310 when the current response 220 satisfies one or more inrush exit conditions indicating an end of the inrush state 308. During the steady state 310, a magnitude of the current response 220 remains at or near a steady state value. Further, the motor 104 operates and/or rotates during the steady state 310 to cause movement of the stowable pedal assembly 102 toward a desired position (e.g., the fully deployed position or the fully stowed position). When the stowable pedal assembly 102 reaches an end of travel at the fully deployed position or the fully stowed position, the current response 220 transitions to the stall state 312. In the stall state 312, the stowable pedal assembly 102 at the end of travel prevents the motor 104 from further rotating. In such examples, the motor 104 applies a threshold torque to the stowable pedal assembly 102 such that the magnitude of the current response 220 reaches a stall threshold. In some examples, in response to the current response 220 satisfying one or more stall conditions, the position determination circuitry 210 of FIG. 2 determines that the stowable pedal assembly 102 is in the fully deployed position or the fully stowed position. In such examples, the motor control circuitry 204 of FIG. 1 shuts off and/or prevents further flow of current to the motor 104, thus causing the current response 220 to transition to the second inactive state 314 at which the magnitude of the current response 220 is approximately zero.

Figure 4:
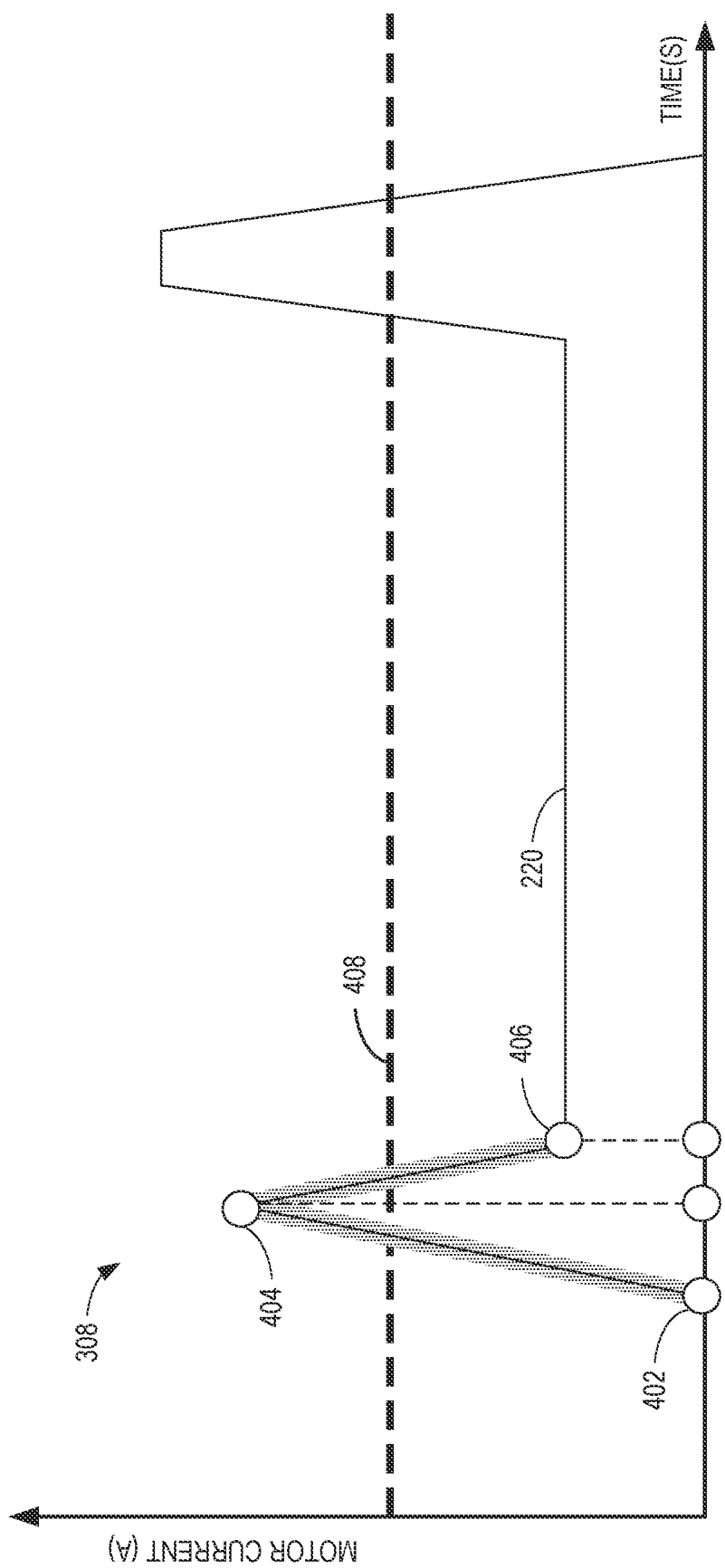
FIG. 4 illustrates an example inrush state of the example current response of FIG. 3.

FIG. 4 illustrates the example inrush state 308 of the example current response 220. In some examples, in response to the example interface circuitry 202 of FIG. 2 obtaining the request 214 to move to the stowable pedal assembly 102 to a desired position (e.g., the fully deployed position or the fully stowed position), the motor control circuitry 204 of FIG. 2 provides the control signal(s) 218 to the motor 104 to turn on the motor 104. In the illustrated example of FIG. 4, the motor control circuitry 204 turns on and/or provides current to the motor 104 at an example inrush start time 402. In this example, the current response 220 increases by an example inrush rise rate until the current response 220 reaches an example inrush current peak 404. After reaching the inrush current peak 404, the current response 220 decreases by an example inrush fall rate until an example inrush end 406. In some examples, the inrush end 406 occurs when the current response 220 is no longer decreasing and/or a magnitude of the current response 220 remains at or near a steady state value.

In some examples, the stowable pedal assembly 102 does not move from a starting position (e.g., a stored position) until the inrush state 308 has occurred. Stated differently, the stowable pedal assembly 102 begins to move after the inrush state 308. As such, the position determination circuitry 210 of FIG. 2 determines a position of the stowable pedal assembly 102 based on whether the current response 220 satisfies one or more inrush conditions that indicate whether the inrush state 308 has occurred. For example, the position determination circuitry 210 determines that the inrush state 308 begins when the current response 220 satisfies one or more inrush start conditions. In this example, the inrush start conditions include the current response 220 having a non-zero magnitude and/or a rate of increase of the current response 220 being greater than or equal to an inrush rate threshold.

In some examples, the position determination circuitry 210 determines whether the current response 220 satisfies one or more inrush exit conditions associated with the inrush state 308. For example, one of the inrush exit conditions includes a magnitude of the current response 220 satisfying an example inrush current threshold 408. Further, the position determination circuitry 210 determines whether the magnitude of the current response 220 reduces to and/or remains at or near a steady state value. For example, the position determination circuitry 210 determines that the current response 220 is at the steady state value when a rate of change of the current response 220 is approximately zero.

In some examples, in response to determining that the current response 220 satisfies the inrush exit conditions, the position determination circuitry 210 determines that the inrush state 308 has occurred and/or the current response 220 is in the steady state 310. Alternatively, in response to determining that the current response 220 does not satisfy the inrush exit conditions during an inrush threshold duration, the position determination circuitry 210 determines that the inrush state 308 did not occur. In some such examples, when the inrush state 308 did not occur, the position determination circuitry 210 determines that the stowable pedal assembly 102 remains in the starting (e.g., stored) position.

Figure 5:
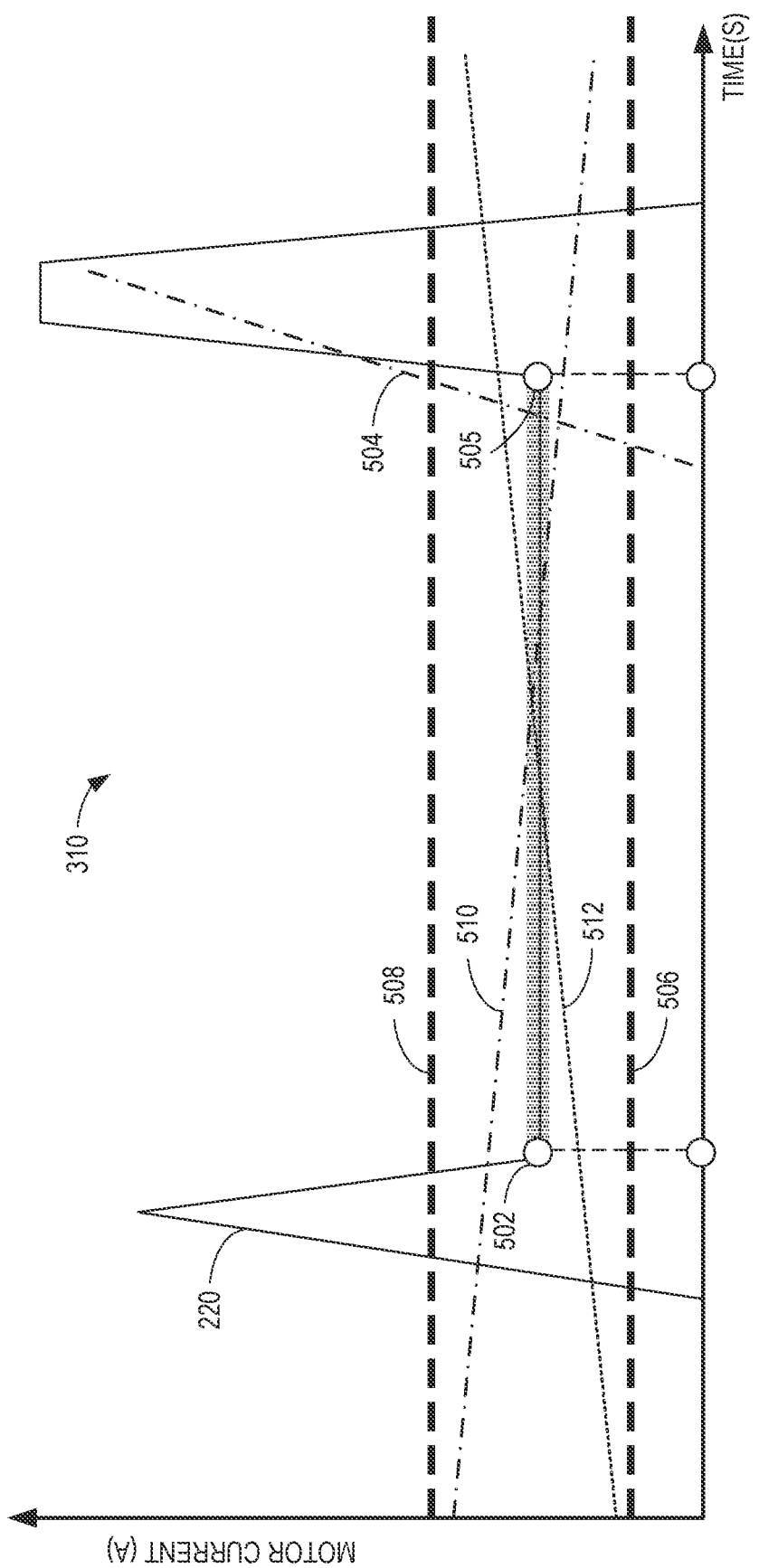
FIG. 5 illustrates an example steady state of the example current response of FIG. 3.

FIG. 5 illustrates the example steady state 310 of the example current response 220. In some examples, when the current response 220 is in the steady state 310, the motor 104 rotates at an approximately constant rate to move the stowable pedal assembly 102 toward a desired position (e.g., the fully deployed position or the fully stowed position). In some examples, a present position of the stowable pedal assembly 102 is based on a duration for which the current response 220 is in the steady state 310. For example, the position determination circuitry 210 can monitor a time elapsed from an example steady state start time 502, and the position determination circuitry 210 determines the present position of the stowable pedal assembly 102 based on the time elapsed.

In some examples, the position determination circuitry 210 determines whether one or more stall start conditions are satisfied. For example, the position determination circuitry 210 detects an end of the steady state 310 and/or a start of the stall state 312 in response to determining that a rate of increase of the current response 220 is greater than or equal to an example stall rate threshold 504. In some examples, the position determination circuitry 210 determines a steady state duration between the steady state start time 502 and a stall state start time 505. In some examples, in response to the steady state duration not satisfying (e.g., violating, being less than) a steady state duration threshold, the position determination circuitry 210 determines that the stowable pedal assembly 102 is in a partially deployed or a partially stowed position. In such examples, the position determination circuitry 210 determines that there may be an obstruction in a travel path of the stowable pedal assembly 102 that prevents the stowable pedal assembly 102 from reaching the fully deployed or the fully stowed position. In some such examples, the interface circuitry 202 of FIG. 2 provides the indication 216 to a driver of the vehicle 100 of FIG. 1 to indicate to the driver that the stowable pedal assembly 102 is partially deployed or partially stowed.

In some examples, the position determination circuitry 210 determines that the current response 220 is in the steady state 310 while one or more steady state conditions are satisfied. For example, the position determination circuitry 210 determines whether a magnitude of the current response 220 satisfies first and second example steady state current thresholds 506, 508. For example, the position determination circuitry 210 determines that the first and second steady state current thresholds 506, 508 are satisfied when the magnitude of the current response 220 is greater than or equal to the first steady state current threshold 506 and less than or equal to the second steady state current threshold 508. Further, the position determination circuitry 210 determines whether a rate of change of the current response 220 satisfies first and second example steady state rate thresholds (e.g., first and second rate of change thresholds) 510, 512. For example, the position determination circuitry 210 determines that the first and second steady state rate thresholds 510, 512 are satisfied when the rate of change of the current response 220 is greater than or equal to the first steady state rate threshold 510 and less than or equal to the second steady state rate threshold 512. In some examples, the first and second steady state rate thresholds 510, 512 enable some fluctuation (e.g., increase and/or decrease) in the magnitude of the current response 220 during the steady state 310. For example, such fluctuation may be caused by friction experienced by one or more components of the motor 104 and/or the stowable pedal assembly 102. In some examples, the first and second steady state rate thresholds 510, 512 prevent the position determination circuitry 210 from prematurely and/or incorrectly determining that the current response 220 is no longer in the steady state 310. In some examples, in response to determining that at least one of the steady state conditions are not satisfied and the stall start conditions are not satisfied, the position determination circuitry 210 determines that the stowable pedal assembly 102 is in a partially deployed or a partially stowed position.

Figure 6:
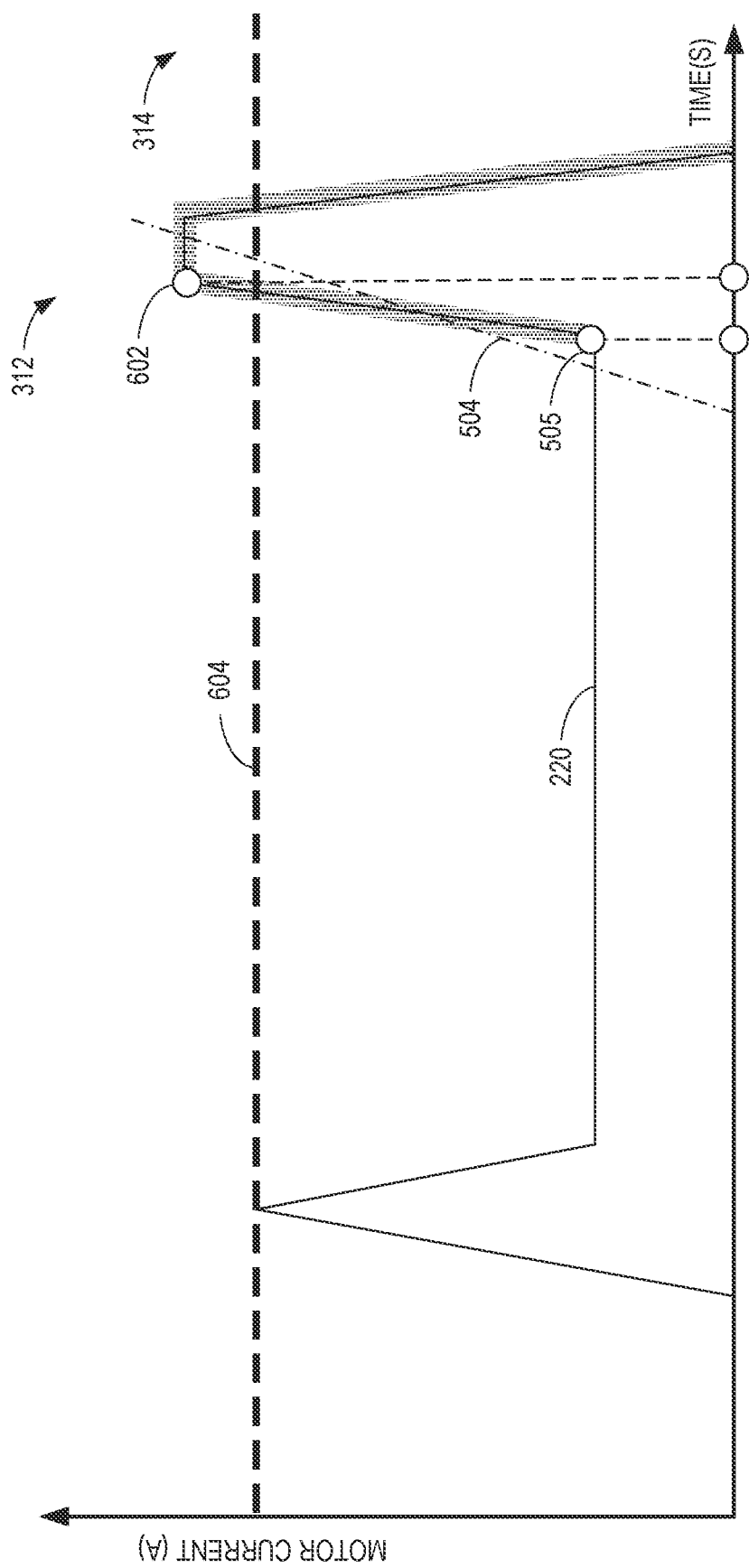
FIG. 6 illustrates an example stall state of the example current response of FIG. 3.

FIG. 6 illustrates the example stall state 312 of the example current response 220. In some examples, the current response 220 transitions to the stall state 312 when the stowable pedal assembly 102 reaches an end of travel at the fully deployed position or the fully stowed position. In such examples, the stowable pedal assembly 102 at an end of travel is prevented from moving and the motor 104 is unable to rotate. During the stall state 312, the motor 104 applies a threshold torque to the stowable pedal assembly 102 and draws a peak current from the pedal control circuitry 106, thus causing the current response 220 to reach an example peak current value 602.

In some examples, the position determination circuitry 210 determines whether one or more stall exit conditions are satisfied to indicate that stowable pedal assembly 102 is at the end of travel (e.g., at the fully deployed or the fully stowed position). For example, the position determination circuitry 210 determines whether the peak current value 602 of the current response 220 is greater than or equal to an example stall state current threshold 604. Further, the position determination circuitry 210 determines a stall duration for which the current response 220 is at or near the peak current value 602. In some examples, in response to the stall duration satisfying a stall duration threshold, the position determination circuitry 210 determines that the stowable pedal assembly 102 is at the fully deployed position or the fully stowed position. In some such examples, the interface circuitry 202 provides the indications 216 to a driver of the vehicle 100 of FIG. 1 to indicate to the driver that the stowable pedal assembly 102 is fully deployed or fully stowed.

In some examples, in response to the position determination circuitry 210 determining that the stowable pedal assembly 102 is fully deployed or fully stowed, the motor control circuitry 204 of FIG. 2 shuts off the motor 104 (e.g., prevents and/or reduces current flow to the motor 104). In such examples, the magnitude of the current response 220 drops to approximately zero at the second inactive state 314. In some examples, the motor 104 remains shut off and, thus, the stowable pedal assembly 102 is held in its present position until the interface circuitry 202 obtains another request 214 to change the position of the stowable pedal assembly 102.

While an example manner of implementing the pedal control circuitry 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface circuitry 202, the example motor control circuitry 204, the example parameter calculation circuitry 206, the example response detection circuitry 208, the example position determination circuitry 210, the example database 212, and/or, more generally, the example pedal control circuitry 106 of FIG. 1, may be implemented by hardware alone or by hardware in combination with software and/or firmware. Thus, for example, any of the example interface circuitry 202, the example motor control circuitry 204, the example parameter calculation circuitry 206, the example response detection circuitry 208, the example position determination circuitry 210, the example database 212, and/or, more generally, the example pedal control circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example pedal control circuitry 106 of FIG. 1 may include one or more elements, processes, and/or devices in addition to, or instead of, those illustrated in FIG. 2, and/or may include more than one of any or all of the illustrated elements, processes and devices.

Figure 7:
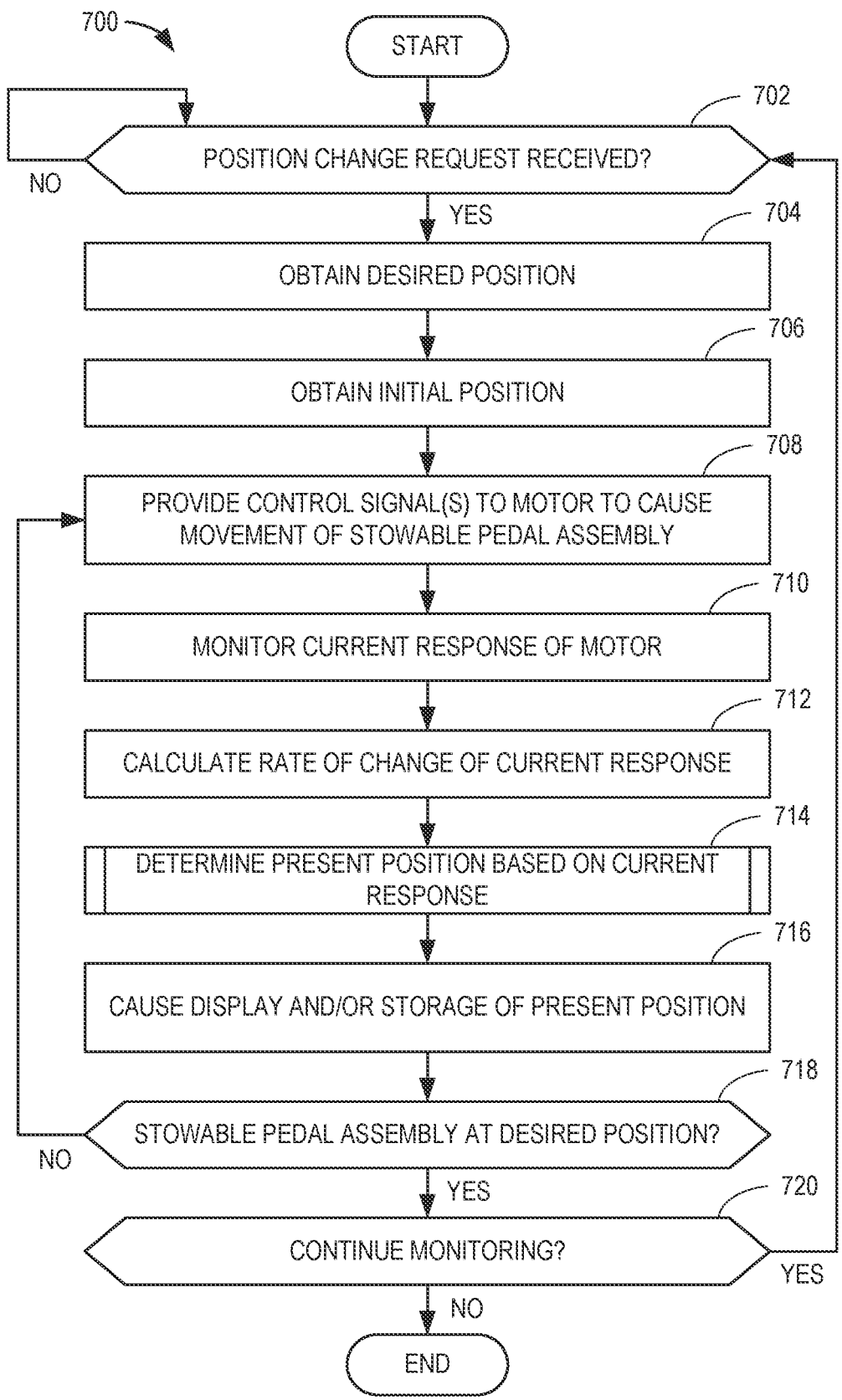
FIG. 7 is a flowchart representative of example machine readable instructions and/or example operations that may be executed by example processor circuitry to implement the example pedal control circuitry of FIG. 2.

Flowcharts representative of example machine readable instructions, which may be executed to configure processor circuitry to implement the pedal control circuitry 106 of FIG. 2, are shown in FIGS. 7 and/or 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7 and/or 8, many other methods of implementing the example pedal control circuitry 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 7 and/or 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to control a position of the example stowable pedal assembly 102 of FIG. 1. The machine readable instructions and/or the operations 700 of FIG. 7 begin at block 702, at which the example pedal control circuitry 106 of FIGS. 1 and/or 2 determines whether a request (e.g., a position change request) 214 was received. For example, the example interface circuitry 202 of FIG. 2 determines whether one of the requests 214 was received from the user interface 108 and/or the autonomous driving system 110 of FIG. 1 to change the position of the stowable pedal assembly 102. In response to the interface circuitry 202 determining that a request 214 was received (e.g., block 702 returns a result of YES), control proceeds to block 704. Alternatively, in response to the interface circuitry 202 determining that no requests were received (e.g., block 702 returns a result of NO), control returns to block 702 until one of the requests 214 is received by the interface circuitry 202

At block 704, the example pedal control circuitry 106 obtains a desired position of the stowable pedal assembly 102. For example, the interface circuitry 202 obtains the desired position from the request(s) 214, where the desired position indicates whether the stowable pedal assembly 102 is to be fully deployed or fully stowed.

At block 706, the example pedal control circuitry 106 obtains an initial position of the stowable pedal assembly 102. For example, the interface circuitry 202 obtains the initial position from the example database 212 of FIG. 2, where the initial position indicates a present position in which the stowable pedal assembly 102 is held.

At block 708, the example pedal control circuitry 106 provides the control signal(s) 218 of FIG. 2 to the example motor 104 of FIG. 1 to cause movement of the stowable pedal assembly 102. For example, the example motor control circuitry 204 of FIG. 2 provides the control signal(s) 218 to the motor 104 to cause current flow thereto. In some examples, the current flow causes the motor 104 to turn on and/or rotate, where a direction and speed of rotation of the motor 104 is based on the direction and/or amplitude of the current provided to the motor 104. In this example, the motor 104 is operatively coupled to the stowable pedal assembly 102 such that rotation of the motor 104 in a first direction causes movement of the stowable pedal assembly 102 towards the fully deployed position, and rotation of the motor 104 in a second direction causes movement of the stowable pedal assembly 102 towards the fully stowed position.

At block 710, the example pedal control circuitry 106 monitors the current response 220 of the motor 104. For example, the example response detection circuitry 208 of FIG. 2 detects the current response 220 based on current flowing from the motor 104, where the current response 220 indicates a magnitude of the current response 220 over time.

At block 712, the example pedal control circuitry 106 calculates a rate of change of the current response 220. For example, the example parameter calculation circuitry 206 of FIG. 2 calculates the rate of the change of the current response 220 over time.

At block 714, the example pedal control circuitry 106 determines a present position (e.g., a current position) of the stowable pedal assembly 102 based on the current response 220. For example, the example position determination circuitry 210 determines the present position based on the current response 220 satisfying one or more conditions as described below in connection with FIG. 8.

At block 716, the example pedal control circuitry 106 causes display and/or storage of the present position of the stowable pedal assembly 102. For example, the interface circuitry 202 provides the indication(s) 216 to the user interface 108 to cause the user interface 108 to display whether the stowable pedal assembly 102 is fully deployed, fully stowed, partially deployed, or partially stowed. Additionally or alternatively, the position determination circuitry 210 provides the present position to the database 212 for storage therein.

At block 718, the example pedal control circuitry 106 determines whether the stowable pedal assembly 102 is at the desired position. For example, the position determination circuitry 210 determines whether the present position of the stowable pedal assembly 102 is approximately at the desired position (e.g., within a range of the desired position). In response to the position determination circuitry 210 determining that the stowable pedal assembly 102 is at the desired position (e.g., block 718 returns a result of YES), control proceeds to block 720. Alternatively, in response to the position determination circuitry 210 determining that the stowable pedal assembly 102 is not at the desired position (e.g., block 718 returns a result of NO), control returns to block 708.

At block 720, the example pedal control circuitry 106 determines whether to continue monitoring. For example, the interface circuitry 202 determines whether to continue monitoring based on whether the vehicle 100 of FIG. 1 is operating. In response to the interface circuitry 202 determining to continue monitoring (e.g., block 720 returns a result of YES), control returns to block 702. Alternatively, in response to the interface circuitry 202 determining not to continue monitoring (e.g., block 720 returns a result of NO), control ends.

Figure 8:
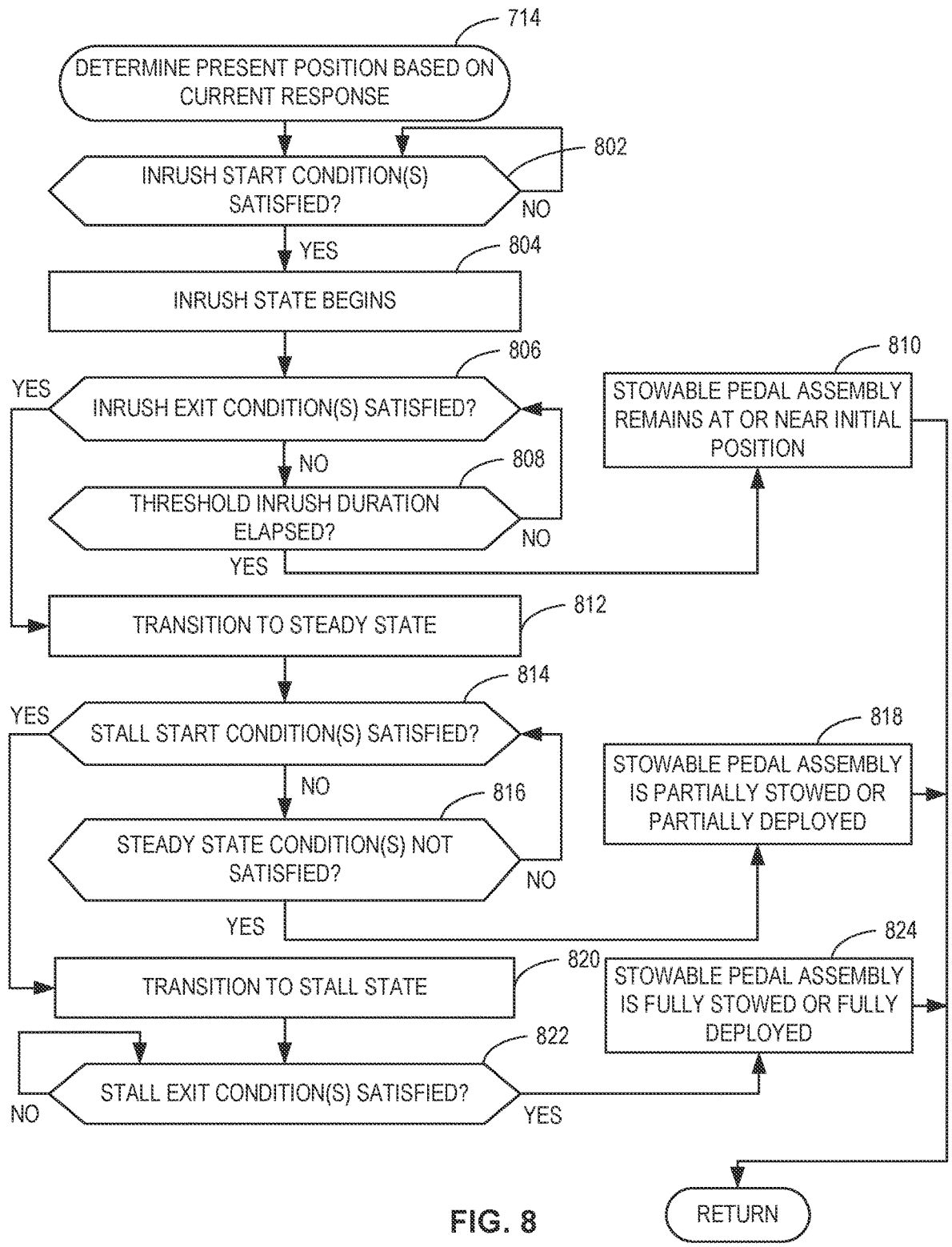
FIG. 8 is a flowchart representative of example machine readable instructions and/or example operations that may be executed by example processor circuitry to determine a present pedal position in connection with block 714 of FIG. 7.

FIG. 8 is a flowchart representative of example machine readable instructions and/or example operations 800 that may be executed and/or instantiated by processor circuitry to determine a present position of the example stowable pedal assembly 102 of FIG. 1 based on the current response 220 in connection with block 714 of FIG. 7. The machine readable instructions and/or the operations 800 of FIG. 8 begin at block 802, at which the example pedal control circuitry 106 of FIGS. 1 and/or 2 determines whether one or more inrush start conditions are satisfied. For example, the example position determination circuitry 210 of FIG. 2 determines whether the inrush start conditions are satisfied based on whether the current response 220 has a nonzero magnitude. In response to the position determination circuitry 210 determining that the inrush start conditions are satisfied (e.g., block 802 returns a result of YES), control proceeds to block 804. Alternatively, in response to the position determination circuitry 210 determining that the inrush start conditions are not satisfied (e.g., block 802 returns a result of NO), control returns to block 802.

At block 804, the example pedal control circuitry 106 determines that the inrush state 308 begins. For example, the position determination circuitry 210 determines that the current response 220 is in the inrush state 308.

At block 806, the example pedal control circuitry 106 determines whether one or more inrush exit conditions are satisfied. For example, the position determination circuitry 210 determines whether a magnitude of the current response 220 satisfies the inrush current threshold 408 of FIG. 4 during the inrush state 308 and determines whether the current response 220 remains at or near a steady state value at the inrush end 406. In response to the position determination circuitry 210 determining that the inrush exit conditions are satisfied (e.g., block 806 returns a result of YES), control proceeds to block 812. Alternatively, in response to the position determination circuitry 210 determining that the inrush exit conditions are not satisfied (e.g., block 806 returns a result of NO), control proceeds to block 808.

At block 808, the example pedal control circuitry 106 determines whether a threshold inrush duration has elapsed. For example, the position determination circuitry 210 monitors a time elapsed from the inrush start time 402 and determines whether the time elapsed is greater than or equal to the threshold inrush duration. In response to the position determination circuitry 210 determining that the threshold inrush duration has elapsed (e.g., block 808 returns a result of YES), control proceeds to block 810. Alternatively, in response to the position determination circuitry 210 determining that the threshold inrush duration has not elapsed (e.g., block 808 returns a result of NO), control returns to block 806.

At block 810, the example pedal control circuitry 106 determines that the stowable pedal assembly 102 remains at or near the initial position. For example, the position determination circuitry 210 determines that the present position of the stowable pedal assembly 102 is the initial position. In this example, control proceeds to block 716 of FIG. 7.

At block 812, the example pedal control circuitry 106 determines that the steady state 310 begins. For example, the position determination circuitry 210 determines that the current response 220 is in the steady state 310.

At block 814, the example pedal control circuitry 106 determines whether one or more stall start conditions are satisfied. For example, the position determination circuitry 210 determines whether the rate of change of the current response 220 is at or above the stall rate threshold 504 of FIG. 5. In such examples, the position determination circuitry 210 also determines whether a steady state duration of the steady state 310 satisfies a steady state duration threshold. In response to the position determination circuitry 210 determining that the stall start conditions are satisfied (e.g., block 814 returns a result of YES), control proceeds to block 820. Alternatively, in response to the position determination circuitry 210 determining that the stall start conditions are not satisfied (e.g., block 814 returns a result of NO), control proceeds to block 816.

At block 816, the example pedal control circuitry 106 determines whether a steady state duration threshold and/or whether one or more steady state conditions are not satisfied. For example, the position determination circuitry 210 determines that one or more of the steady state conditions are not satisfied when a magnitude of the current response 220 does not satisfy the first and second steady state current thresholds 506, 508 and/or when the rate of change of the current response 220 does not satisfy the first and second steady state rate thresholds 510, 512. In response to the position determination circuitry 210 determining that one or more of the steady state conditions are not satisfied (e.g., block 816 returns a result of YES), control proceeds to block 818.

Alternatively, in response to the position determination circuitry 210 determining that the steady state conditions are satisfied (e.g., block 816 returns a result of NO), control returns to block 814.

At block 818, the example pedal control circuitry 106 determines that the stowable pedal assembly 102 is partially deployed or partially stowed. For example, the position determination circuitry 210 determines that the present position of the stowable pedal assembly 102 is in the partially deployed position or the partially stowed position. In this example, control proceeds to block 716 of FIG. 7.

At block 820, the example pedal control circuitry 106 determines that the stall state 312 begins. For example, the position determination circuitry 210 determines that the current response 220 is in the stall state 312.

At block 822, the example pedal control circuitry 106 determines whether one or more stall exit conditions are satisfied. For example, the position determination circuitry 210 determines whether a magnitude of the current response 220 satisfies the stall state current threshold 604 and/or whether the current response 220 is at a peak current value for at least a stall duration threshold. In response to the position determination circuitry 210 determining that the stall exit conditions are satisfied (e.g., block 822 returns a result of YES), control proceeds to block 824. Alternatively, in response to the position determination circuitry 210 determining that one or more of the stall exit conditions are not satisfied (e.g., block 822 returns a result of NO), control returns to block 822.

At block 824, the example pedal control circuitry 106 determines that the stowable pedal assembly 102 is fully deployed or fully stowed. For example, the position determination circuitry 210 determines that the present position of the stowable pedal assembly 102 is in the fully deployed position or the fully stowed position. In this example, control proceeds to block 716 of FIG. 7.

Figure 9:
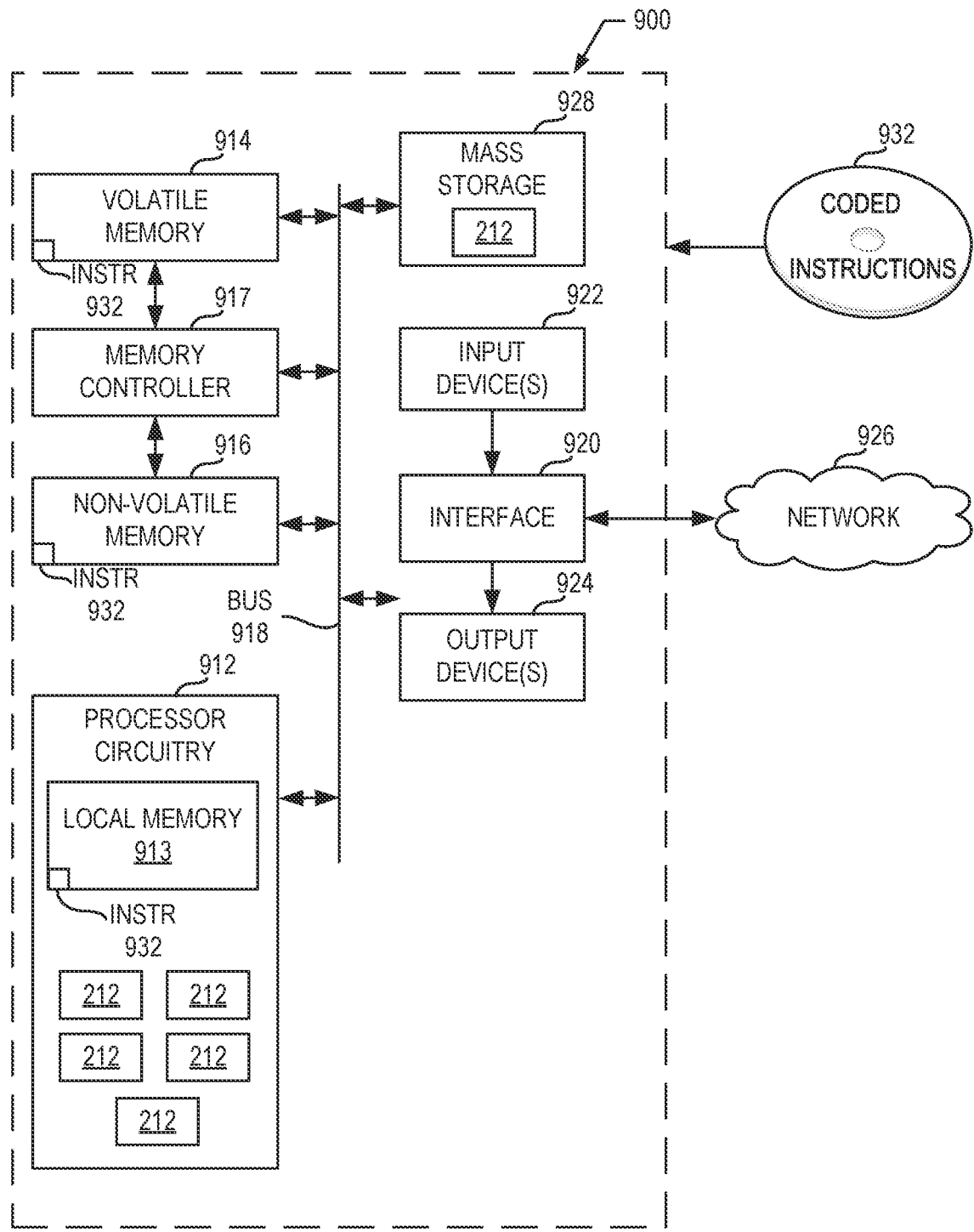
FIG. 9 is a block diagram of an example processing platform including processor circuitry structured to execute the example machine readable instructions and/or the example operations of FIGS. 7 and/or 8 to implement the example pedal control circuitry of FIG. 2.

FIG. 9 is a block diagram of an example processor platform 900 structured to execute and/or instantiate the machine readable instructions and/or the operations of FIGS. 7 and/or 8 to implement the pedal control circuitry 106 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example interface circuitry 202, the example motor control circuitry 204, the example parameter calculation circuitry 206, the example response detection circuitry 208, the example position determination circuitry 210, and the example database 212.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 7 and/or 8, may be stored in the mass storage device 928, in the volatile memory 914, in the non-volatile memory 916, and/or on a removable non-transitory computer readable storage medium such as a CD or DVD.

Figure 10:
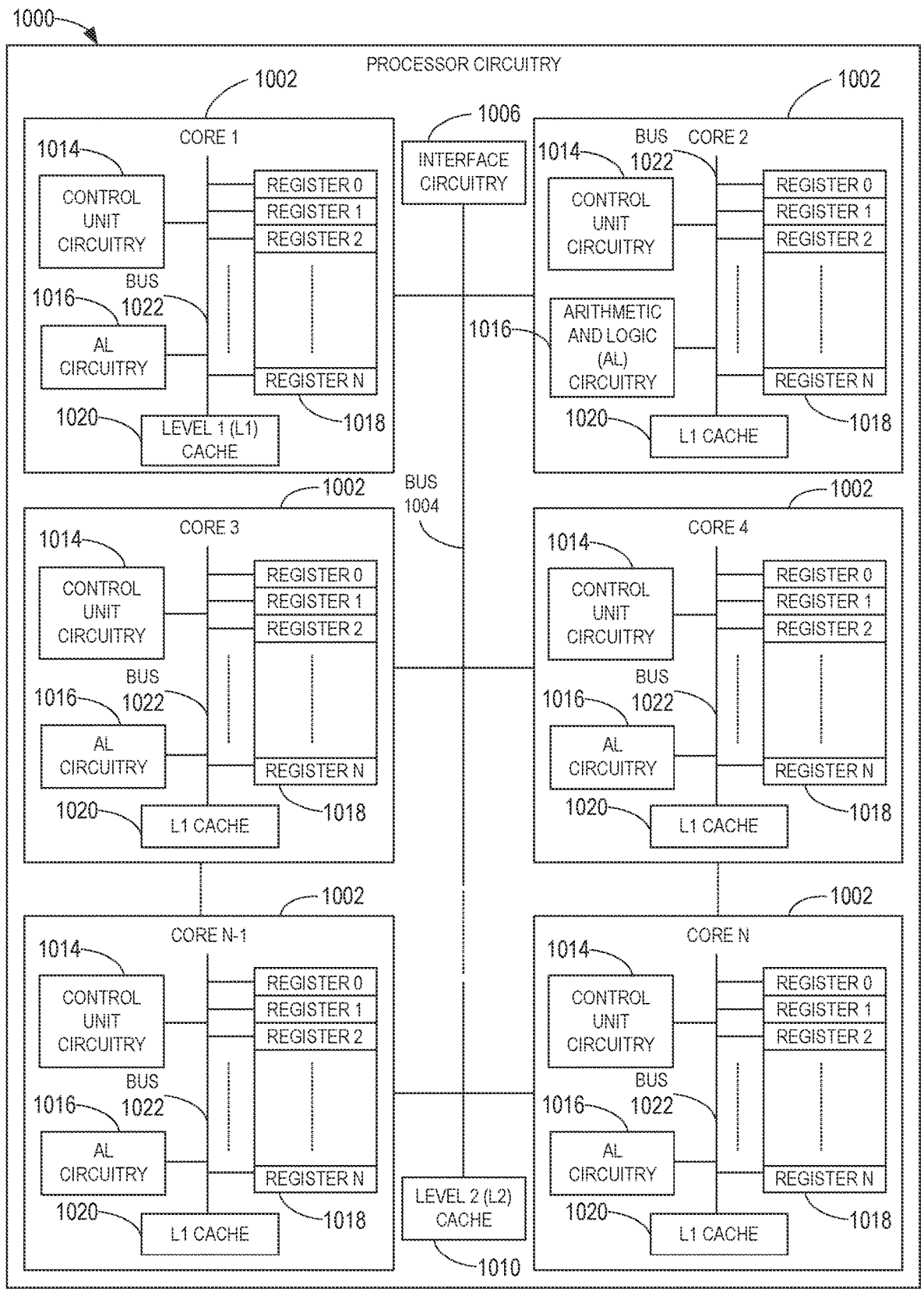
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 7 and/or 8 to effectively instantiate the pedal control circuitry 106 of FIG. 2 as logic circuits to perform the operations corresponding to those machine readable instructions. In some such examples, the pedal control circuitry 106 of FIG. 2 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 7 and/or 8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
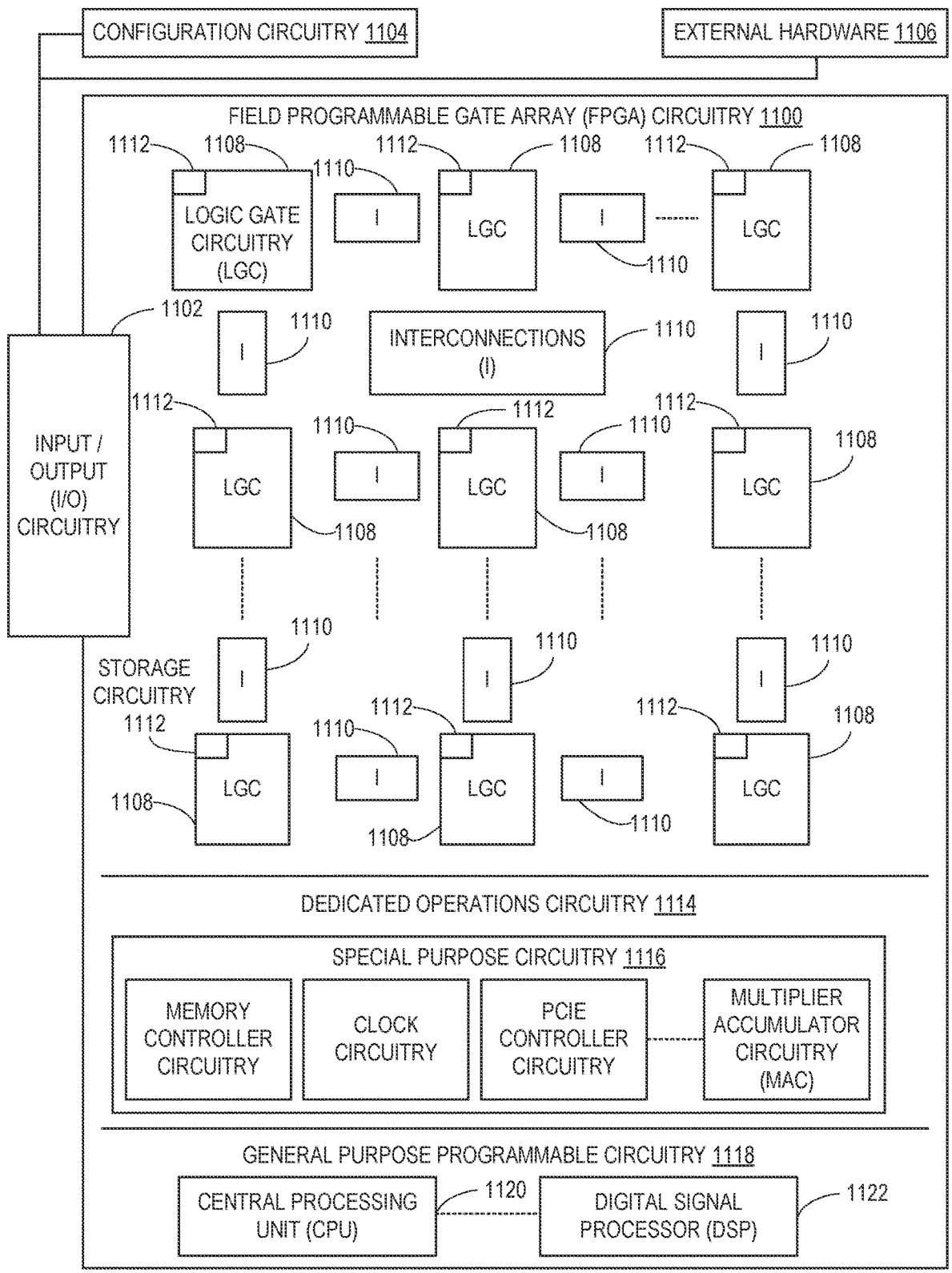
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 7 and/or 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 7 and/or 8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 7 and/or 8. As such, the FPGA circuitry 1100 may be structured to effectively instantiate some or all of the machine readable instructions of the flowcharts of FIGS. 7 and/or 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 7 and/or 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 7 and/or 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 7 and/or 8 may be executed by one or more of the cores 1002 of FIG. 10, a second portion of the machine readable instructions represented by the flowcharts of FIGS. 7 and/or 8 may be executed by the FPGA circuitry 1100 of FIG. 11, and/or a third portion of the machine readable instructions represented by the flowcharts of FIGS. 7 and/or 8 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
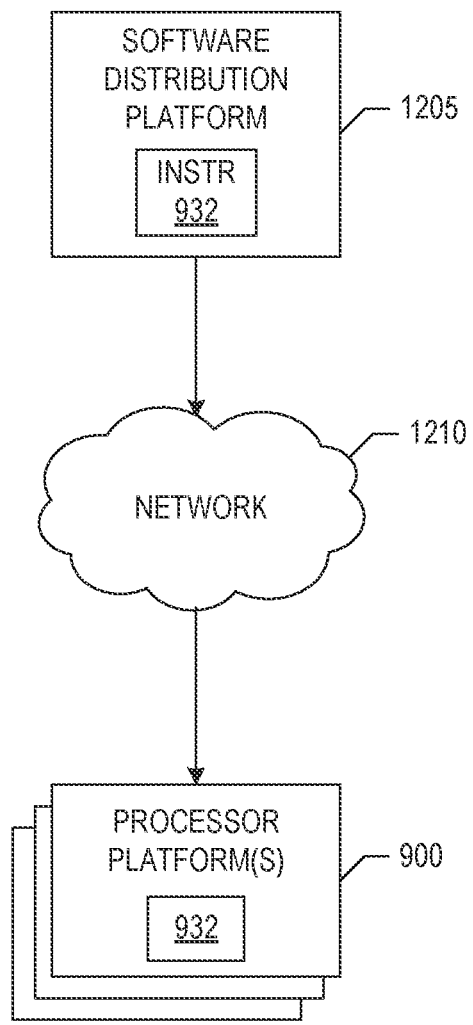
FIG. 12 is a block diagram of an example software distribution platform (e.g., one or more servers) to distribute software (e.g., software corresponding to the example machine readable instructions of FIGS. 7 and/or 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 700 and 800 of FIGS. 7 and 8, as described above. The one or more servers of the example software distribution platform 1205 are in communication with an example network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 932 of FIG. 9, may be downloaded to the example processor platform 900, which is to execute the machine readable instructions 932 to implement the pedal control circuitry 106 of FIG. 2. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that determine a position of a stowable pedal assembly. Examples disclosed herein detect a current response of a motor operatively coupled to the stowable pedal assembly to cause movement thereof. Examples disclosed herein determine whether the stowable pedal assembly is fully deployed, partially deployed, fully stowed, or partially deployed based on whether the current response satisfies one or more thresholds associated with an inrush state, a steady state, and a stall state of the current response. Disclosed systems, methods, apparatus, and articles of manufacture improve the efficiency of using a computing device by accurately measuring the position of the stowable pedal assembly without the use of designated position sensors, thus reducing part costs and/or weight associated with the stowable pedal assembly. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine positions of a stowable pedal assembly are disclosed herein. Further examples and combinations thereof include the following:

Example 1 includes an apparatus to determine a position of a stowable pedal assembly of a vehicle, the apparatus comprising motor control circuitry to provide a control signal to a motor operatively coupled to the stowable pedal assembly, the motor to cause movement of the stowable pedal assembly toward a desired position, response detection circuitry to detect a current response of the motor to the control signal, and position determination circuitry to determine the position of the stowable pedal assembly based on the current response.

Example 2 includes the apparatus of example 1, further including parameter calculation circuitry to calculate a rate of change of the current response, the position determination circuitry to determine the position based on the calculated rate of change.

Example 3 includes the apparatus of example 1, further including interface circuitry to obtain the desired position based on at least one of user input to a user interface of the vehicle or based on whether autonomous driving of the vehicle is engaged.

Example 4 includes the apparatus of example 1, wherein the position determination circuitry is to determine that the stowable pedal assembly is in a fully stowed position or a fully deployed position in response to determining that the current response satisfies an inrush state, a steady state, and a stall state.

Example 5 includes the apparatus of example 4, wherein the position determination circuitry is to determine that the stowable pedal assembly is in a partially stowed position or a partially deployed position in response to at least one of the steady state not satisfying a steady state duration threshold or the current response not satisfying one or more steady state conditions.

Example 6 includes the apparatus of example 5, wherein the steady state conditions include a rate of change of the current response being greater than a first threshold, the rate of change being less than a second threshold, a magnitude of the current response being greater than a third threshold, or the magnitude being less than a fourth threshold.

Example 7 includes the apparatus of example 5, wherein the position determination circuitry is to identify an obstruction of the stowable pedal assembly in response to the steady state not satisfying the steady state duration threshold.

Example 8 includes a non-transitory computer readable medium comprising instructions that, when executed, cause processor circuitry to at least provide a control signal to a motor operatively coupled to a stowable pedal assembly of a vehicle, the motor to cause movement of the stowable pedal assembly toward a desired position, detect a current response of the motor to the control signal, and determine a position of the stowable pedal assembly based on the current response.

Example 9 includes the non-transitory computer readable medium of example 8, wherein the instructions, when executed, further cause the processor circuitry to calculate a rate of change of the current response and determine the position based on the calculated rate of change.

Example 10 includes the non-transitory computer readable medium of example 8, wherein the instructions, when executed, further cause the processor circuitry to obtain the desired position based on at least one of user input to a user interface of the vehicle or based on whether autonomous driving of the vehicle is engaged.

Example 11 includes the non-transitory computer readable medium of example 8, wherein the instructions, when executed, further cause the processor circuitry to determine that the stowable pedal assembly is in a fully stowed position or a fully deployed position in response to determining that the current response satisfies an inrush state, a steady state, and a stall state.

Example 12 includes the non-transitory computer readable medium of example 11, wherein the instructions, when executed, further cause the processor circuitry to determine that the stowable pedal assembly is in a partially stowed position or a partially deployed position in response to at least one of the steady state not satisfying a steady state duration threshold or the current response not satisfying one or more steady state conditions.

Example 13 includes the non-transitory computer readable medium of example 12, wherein the instructions, when executed, further cause the processor circuitry to determine that the current response does not satisfy the steady state conditions in response to determining that at least one of a rate of change of the current response is greater than a first threshold, the rate of change is less than a second threshold, a magnitude of the current response is greater than a third threshold, or the magnitude is less than a fourth threshold.

Example 14 includes the non-transitory computer readable medium of example 12, wherein the instructions, when executed, further cause the processor circuitry to identify an obstruction of the stowable pedal assembly in response to the steady state not satisfying the steady state duration threshold.

Example 15 includes an apparatus comprising memory, instructions, and processor circuitry to execute the instructions to at least provide a control signal to a motor operatively coupled to a stowable pedal assembly of a vehicle, the motor to cause movement of the stowable pedal assembly toward a desired position, detect a current response of the motor to the control signal, and determine a position of the stowable pedal assembly based on the current response.

Example 16 includes the apparatus of example 15, wherein the processor circuitry is to execute the instructions to calculate a rate of change of the current response and determine the position based on the calculated rate of change.

Example 17 includes the apparatus of example 15, wherein the processor circuitry is to execute the instructions to obtain the desired position based on at least one of user input to a user interface of the vehicle or based on whether autonomous driving of the vehicle is engaged.

Example 18 includes the apparatus of example 15, wherein the processor circuitry is to execute the instructions to determine that the stowable pedal assembly is in a fully stowed position or a fully deployed position in response to determining that the current response satisfies an inrush state, a steady state, and a stall state.

Example 19 includes the apparatus of example 18, wherein the processor circuitry is to execute the instructions to determine that the stowable pedal assembly is in a partially stowed position or a partially deployed position in response to at least one of the steady state not satisfying a steady state duration threshold or the current response not satisfying one or more steady state conditions.

Example 20 includes the apparatus of example 19, wherein the processor circuitry is to execute the instructions to determine that the current response does not satisfy the steady state conditions in response to determining that at least one of a rate of change of the current response is greater than a first threshold, the rate of change is less than a second threshold, a magnitude of the current response is greater than a third threshold, or the magnitude is less than a fourth threshold.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to determine a position of a stowable pedal assembly of a vehicle, the apparatus comprising:
   motor control circuitry to provide a control signal to a motor operatively coupled to the stowable pedal assembly, the control signal to cause the motor to move the stowable pedal assembly toward a desired position;
   response detection circuitry to detect a current response of the motor to the control signal; and
   position determination circuitry to:
   determine a steady state of the current response by comparing the current response to first and second rate of change thresholds;
   monitor a duration from a start time at which the current response begins the steady state; and
   determine position of the stowable pedal assembly based on a comparison between the duration and a steady state duration threshold.

2. The apparatus of claim 1, further including parameter calculation circuitry to calculate a rate of change of the current response, the position determination circuitry to determine the position based on the calculated rate of change.

3. The apparatus of claim 1, further including interface circuitry to obtain the desired position based on at least one of user input to a user interface of the vehicle or based on whether autonomous driving of the vehicle is engaged.

4. The apparatus of claim 1, wherein the position determination circuitry is to determine that the stowable pedal assembly is in a fully stowed position or a fully deployed position in response to determining that the current response satisfies an inrush state, the steady state after the inrush state, and a stall state after the steady state.

5. The apparatus of claim 1, wherein the position determination circuitry is to determine that the stowable pedal assembly is in a partially stowed position or a partially deployed position in response to the duration not satisfying the steady state duration threshold or the current response not satisfying one or more steady state conditions.

6. The apparatus of claim 5, wherein the steady state conditions include a magnitude of the current response being greater than a third threshold, or the magnitude being less than a fourth threshold.

7. The apparatus of claim 5, wherein the position determination circuitry is to identify an obstruction of the stowable pedal assembly in response to the duration not satisfying the steady state duration threshold.

8. A non-transitory computer readable medium comprising instructions that, when executed, cause processor circuitry to at least:
   provide a control signal to a motor operatively coupled to a stowable pedal assembly of a vehicle, the control signal to cause the motor to move the stowable pedal assembly toward a desired position;

detect a current response of the motor to the control signal;

determine a steady state of the current response by comparing the current response to first and second rate of change thresholds;

monitor a duration from a start time at which the current response begins the steady state; and determine a position of the stowable pedal assembly based on a comparison between the duration and a steady state duration threshold.

9. The non-transitory computer readable medium of claim 8, wherein the instructions, when executed, further cause the processor circuitry to calculate a rate of change of the current response and determine the position based on the calculated rate of change.

10. The non-transitory computer readable medium of claim 8, wherein the instructions, when executed, further cause the processor circuitry to obtain the desired position based on at least one of user input to a user interface of the vehicle or based on whether autonomous driving of the vehicle is engaged.

11. The non-transitory computer readable medium of claim 8, wherein the instructions, when executed, further cause the processor circuitry to determine that the stowable pedal assembly is in a fully stowed position or a fully deployed position in response to determining that the current response satisfies an inrush state, the steady state after the inrush state, and a stall state after the steady state.

12. The non-transitory computer readable medium of claim 8, wherein the instructions, when executed, further cause the processor circuitry to determine that the stowable pedal assembly is in a partially stowed position or a partially deployed position in response to at least one of the duration not satisfying the steady state duration threshold or the current response not satisfying one or more steady state conditions.

13. The non-transitory computer readable medium of claim 12, wherein the instructions, when executed, further cause the processor circuitry to determine that the current response does not satisfy the steady state conditions in response to determining that at least one of a magnitude of the current response is greater than a third threshold, or the magnitude is less than a fourth threshold.

14. The non-transitory computer readable medium of claim 8, wherein the instructions, when executed, further cause the processor circuitry to identify an obstruction of the stowable pedal assembly in response to the duration not satisfying the steady state duration threshold.

15. An apparatus comprising:
memory;
instructions; and
processor circuitry to execute the instructions to at least:
provide a control signal to a motor operatively coupled to a stowable pedal assembly of a vehicle, the control signal to cause the motor to move the stowable pedal assembly toward a desired position;
detect a current response of the motor to the control signal;
determine a steady state of the current response by comparing the current response to first and second rate of change thresholds;
monitor a duration from a start time at which the current response begins the steady state; and
determine a position of the stowable pedal assembly based on a comparison between the duration and a steady state duration threshold.

16. The apparatus of claim 15, wherein the processor circuitry is to execute the instructions to calculate a rate of change of the current response and determine the position based on the calculated rate of change.

17. The apparatus of claim 15, wherein the processor circuitry is to execute the instructions to obtain the desired position based on at least one of user input to a user interface of the vehicle or based on whether autonomous driving of the vehicle is engaged.

18. The apparatus of claim 15, wherein the processor circuitry is to execute the instructions to determine that the stowable pedal assembly is in a fully stowed position or a fully deployed position in response to determining that the current response satisfies an inrush state, the steady state after the inrush state, and a stall state after the steady state.

19. The apparatus of claim 15, wherein the processor circuitry is to execute the instructions to determine that the stowable pedal assembly is in a partially stowed position or a partially deployed position in response to at least one of the duration not satisfying the steady state duration threshold or the current response not satisfying one or more steady state conditions.

20. The apparatus of claim 19, wherein the processor circuitry is to execute the instructions to determine that the current response does not satisfy the steady state conditions in response to determining that at least one of a magnitude of the current response is greater than a third threshold, or the magnitude is less than a fourth threshold.

* * * * *